(12) United States Patent
Abraham et al.

(10) Patent No.: US 10,091,713 B2
(45) Date of Patent: Oct. 2, 2018

(54) NUMEROLOGY AND FRAMES FOR NETWORKS IN THE SUB-1GHZ (S1G) BAND

(71) Applicant: QUALCOMM Incorporated, San Diego, CA (US)

(72) Inventors: Santosh Paul Abraham, San Diego, CA (US); Alireza Raissinia, Monte Sereno, CA (US); George Cherian, San Diego, CA (US); Abhishek Pramod Patil, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 213 days.

(21) Appl. No.: 15/006,583

(22) Filed: Jan. 26, 2016

(65) Prior Publication Data

US 2016/0219498 A1 Jul. 28, 2016

Related U.S. Application Data

(60) Provisional application No. 62/108,525, filed on Jan. 27, 2015.

(51) Int. Cl.
*H04J 3/00* (2006.01)
*H04W 48/16* (2009.01)
(Continued)

(52) U.S. Cl.
CPC .......... *H04W 48/16* (2013.01); *H04W 56/00* (2013.01); *H04W 56/001* (2013.01); *H04W 72/0446* (2013.01); *H04W 84/18* (2013.01)

(58) Field of Classification Search
None
See application file for complete search history.

(56) References Cited

U.S. PATENT DOCUMENTS

2014/0321317 A1* 10/2014 Kasslin ................ H04W 4/08
370/254
2015/0036540 A1* 2/2015 Kasslin ................ H04W 48/18
370/254

(Continued)

FOREIGN PATENT DOCUMENTS

| WO | WO-2013151902 A1 | 10/2013 |
| WO | WO-2014165525 A1 | 10/2014 |
| WO | WO-2014209566 A1 | 12/2014 |

OTHER PUBLICATIONS

International Search Report and Written Opinion—PCT/US2016/015067—ISA/EPO—May 31, 2016.

*Primary Examiner* — Phirin Sam
(74) *Attorney, Agent, or Firm* — Patterson & Sheridan, L.L.P.

(57) ABSTRACT

Aspects of the present disclosure provide techniques for numerology and frames for neighbor aware networks (NAN) in the sub-1 GHz (S1G) band. According to certain aspects, an apparatus for wireless communications is provided. The apparatus generally includes a processing system configured to: determine occurrence of a first type of discovery window for a network that occurs according to a first interval, and determine occurrence of a second type of discovery window for the that occurs according to a second interval shorter than the first interval; and a first interface is configured to output, for transmission in the network, at least one of time synchronization information or service information during at least one of the first type of discovery window or the second type of discovery window.

25 Claims, 10 Drawing Sheets

(51) Int. Cl.
*H04W 72/04* (2009.01)
*H04W 56/00* (2009.01)
*H04W 84/18* (2009.01)

(56) References Cited

U.S. PATENT DOCUMENTS

| | | | |
|---|---|---|---|
| 2015/0200811 A1* | 7/2015 | Kasslin | H04L 41/12 370/254 |
| 2015/0319675 A1* | 11/2015 | Park | H04W 48/16 370/338 |
| 2017/0111849 A1* | 4/2017 | Park | H04W 48/08 |
| 2018/0098211 A1* | 4/2018 | Park | H04W 8/06 |

* cited by examiner

NUMEROLOGY AND FRAMES FOR NETWORKS IN THE SUB-1GHZ (S1G) BAND

CLAIM OF PRIORITY UNDER 35 U.S.C. § 119

The present Application for Patent claims benefit of U.S. Provisional Patent Application Ser. No. 62/108,525, filed Jan. 27, 2015, assigned to the assignee hereof and hereby expressly incorporated by reference herein.

BACKGROUND

Field of the Disclosure

Certain aspects of the present disclosure generally relate to wireless communications and, more particularly, to discovery of services and/or synchronization information for networks, such as those in the sub-1 GHz (S1G) band.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than wireless ranges associated with frequency ranges of other IEEE 802.11 technologies and potentially fewer issues associated with path losses due to obstructions.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Aspects of the present disclosure generally relate to wireless communications and, more particularly, numerology and frames for discovery of service and/or synchronization information in neighbor aware networks (NAN) in the sub-1 GHz (S1G) band.

Aspects of the present disclosure provide an apparatus for wireless communications. The apparatus generally includes a processing system configured to: determine occurrence of a first type of discovery window for a network that occurs according to a first interval, determine occurrence of a second type of discovery window for the network that occurs according to a second interval shorter than the first interval; and an interface configured to output, for transmission in the network, at least one of time synchronization information or service information during at least one of the first type of discovery window or the second type of discovery window.

Aspects of the present disclosure provide a method for wireless communications by an apparatus. The method generally includes determining occurrence of a first type of discovery window for a network that occurs according to a first interval, determining occurrence of a second type of discovery window for the network that occurs according to a second interval shorter than the first interval, and outputting, for transmission in the network, at least one of time synchronization information or service information during at least one of the first type of discovery window or the second type of discovery window.

Aspects of the present disclosure provide an apparatus for wireless communications. The apparatus generally includes means for determining occurrence of a first type of discovery window for a network that occurs according to a first interval, means for determining occurrence of a second type of discovery window for the network that occurs according to a second interval shorter than the first interval, and means for outputting, for transmission in the network, at least one of time synchronization information or service information during at least one of the first type of discovery window or the second type of discovery window.

Aspects of the present disclosure provide a computer program product. The computer program product generally includes a computer readable medium having instructions stored thereon for determining occurrence of a first type of discovery window for a network that occurs according to a first interval, determining occurrence of a second type of discovery window for the network that occurs according to a second interval shorter than the first interval, and outputting, for transmission in the network, at least one of time synchronization information or service information during at least one of the first type of discovery window or the second type of discovery window.

Aspects of the present disclosure provide station. The station generally includes at least one antenna; a processing system configured to: determine occurrence of a first type of discovery window for a network that occurs according to a first interval, and determine occurrence of a second type of discovery window for the network that occurs according to a second interval shorter than the first interval; and a transmitter configured to transmit, via the at least one antenna, at least one of time synchronization information or service information during at least one of the first type of discovery window or the second type of discovery window.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
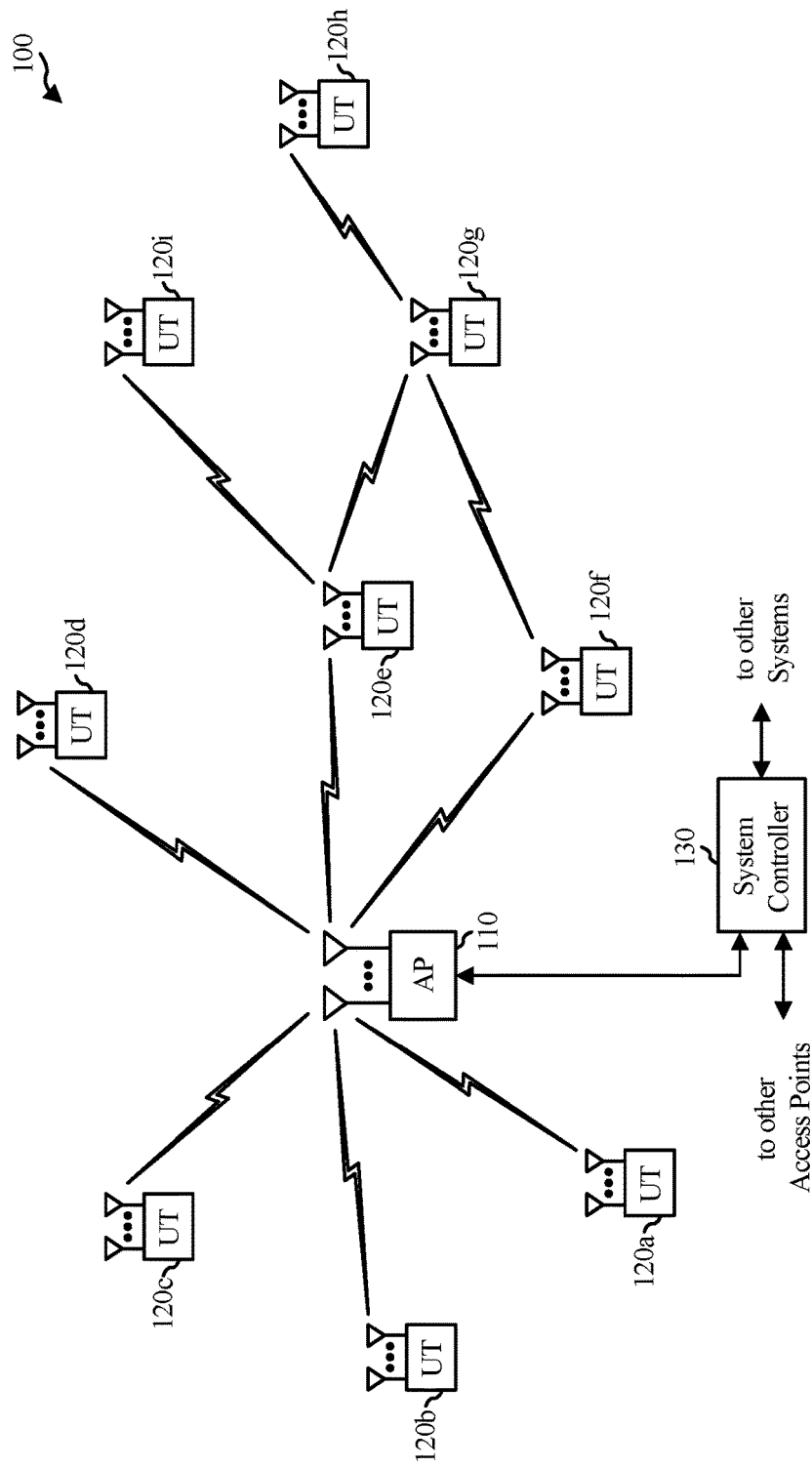
FIG. 1 illustrates a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure generally relate to wireless communications and, more particularly, numerology and frames for discovery of services and/or synchronization information in neighbor aware networks (NAN), for example, operating in the sub-1 GHz (S1G) band. As will be described in more detail herein, different types of discovery windows of different durations and at different intervals may be defined. A NAN device (e.g., access point (AP) or non-AP station in the NAN) may wake up during one or both types of discovery windows to transmit time synchronization information and/or service discovery information.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA" such as an "AP STA" acting as an AP or a "non-AP STA") or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communications System

FIG. 1 illustrates a system 100 in which aspects of the disclosure may be performed. For example, any of the wireless stations including the access point 110 and/or the user terminals 120 may be in a neighbor aware network (NAN). A wireless station may wake up during a first type of discovery window having a first duration and occurring at a first interval and send and/or monitor for time synchronization information or service information.

one or both types of discovery windows to transmit time synchronization information and/or service discovery information. different types of discovery windows of different durations and at different intervals may be defined.

The system 100 may be, for example, a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
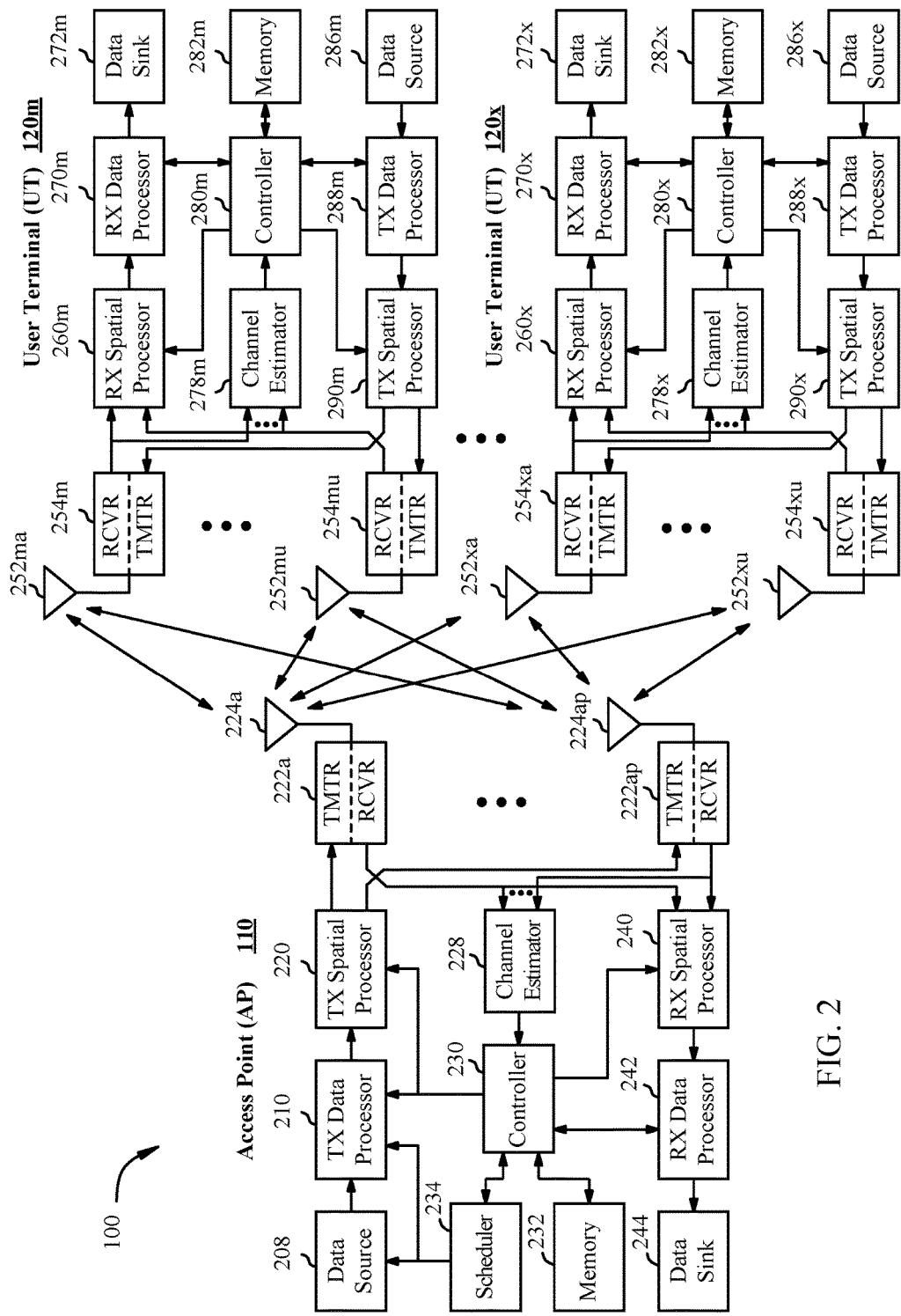
FIG. 2 illustrates a block diagram of an example access point and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, processors 210, 220, 240, 242, and/or controller 230 or antenna 252, Tx/Rx 254, processors 260, 270, 288, and 290, and/or controller 280 may be used to perform the operations described herein and illustrated with reference to FIGS. 6 and 6A.

FIG. 2 illustrates a block diagram of access point 110 two user terminals 120m and 120x in a MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals. The decoded data for each user terminal may be provided to a data sink 272 for storage and/or a controller 280 for further processing.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
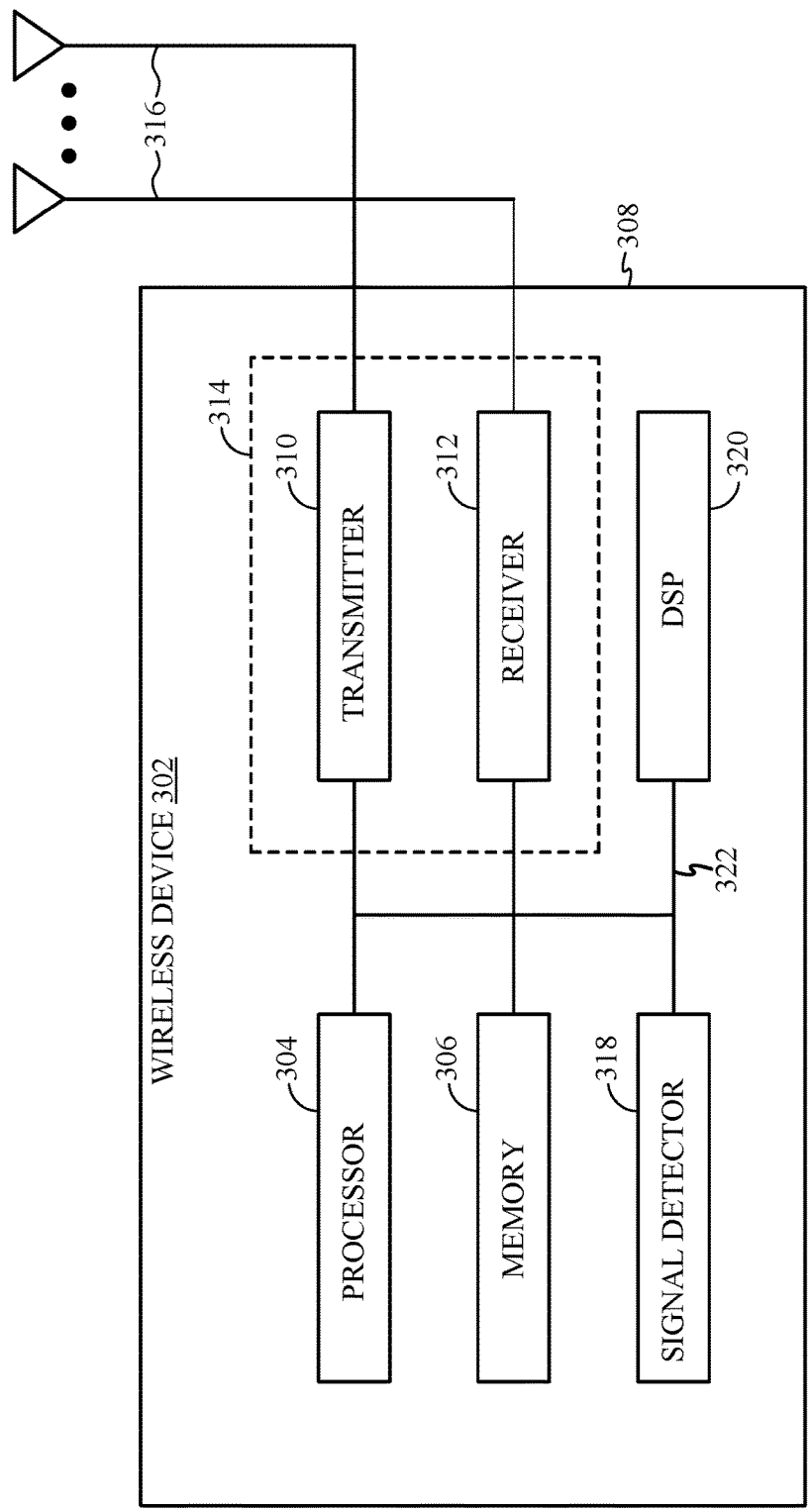
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 600 illustrated in FIG. 6. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Neighbor Aware Network

Due to the increasing popularity of location-enabled (e.g., GPS-enabled) mobile devices, neighbor aware networks (NANs) are emerging. A NAN generally refers to a network for communication between stations (STAs) that are located in relatively close proximity to each other. A NAN provides a mechanism for devices to synchronize the time and channel (e.g., within a S1G band) on which they converge to facilitate the discovery of service that have been made discoverable on existing devices or new devices that enter the environment.

As used herein, a NAN discovery window generally refers to the time (and possibly channel) on which NAN devices converge (e.g., for advertising/discovering services or synchronization information). A collection of NAN devices (e.g., WiFi capable or other type wireless devices that support NAN protocols and which may be NAN Master or NAN non-Master) that are synchronized to the same discovery window schedule may be referred to as a NAN cluster.

Figure 4:
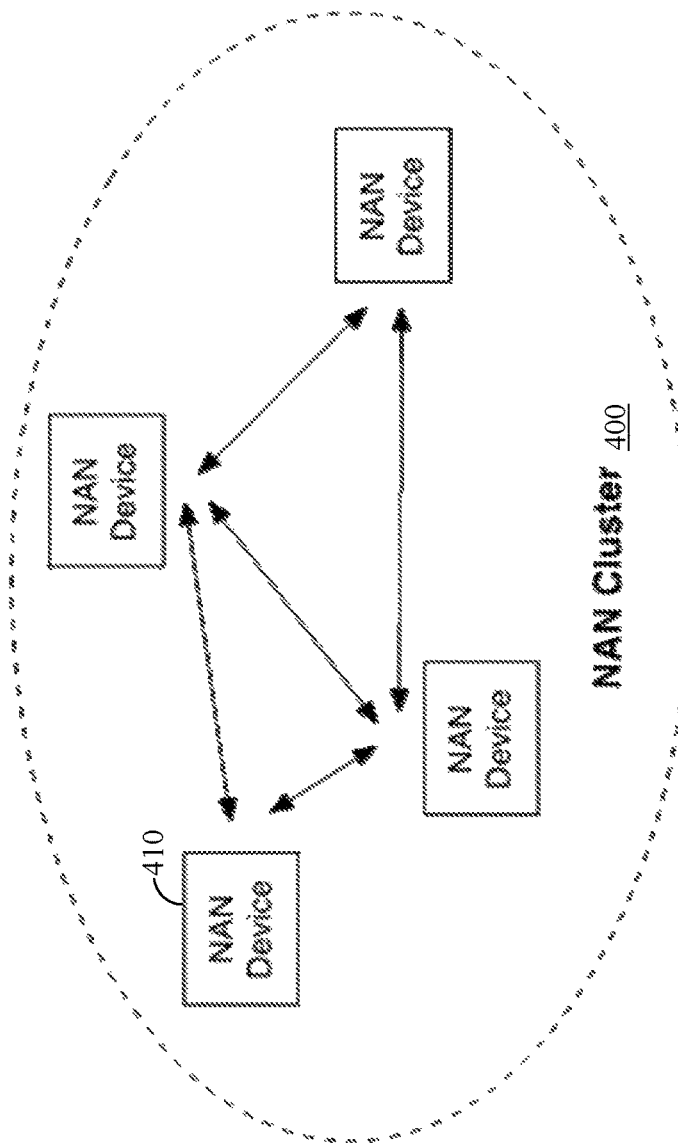
FIG. 4 illustrates an example NAN cluster, in accordance certain aspects of the present disclosure.

FIG. 4 illustrates an example NAN cluster 400, in accordance with certain aspects of the present disclosure, NAN Devices 410 (e.g., such as AP 110 or user terminal 120) that are part of the same NAN Cluster 400 may participate in the NAN Master Selection procedure. Depending on changes in the NAN Cluster 400, such as changes to which NAN Devices 410 are part of the NAN Cluster 400 and/or changes to their Master Ranks, different NAN Devices 410 may be elected to become NAN Devices in Master role at different times.

In some cases, a NAN ID may be used to signify a set of NAN parameters (e.g., applicable to devices that are members of a NAN cluster or network of NAN clusters). A NAN network may, thus, refer to a collection of NAN clusters that share the same NAN ID.

Figure 5:
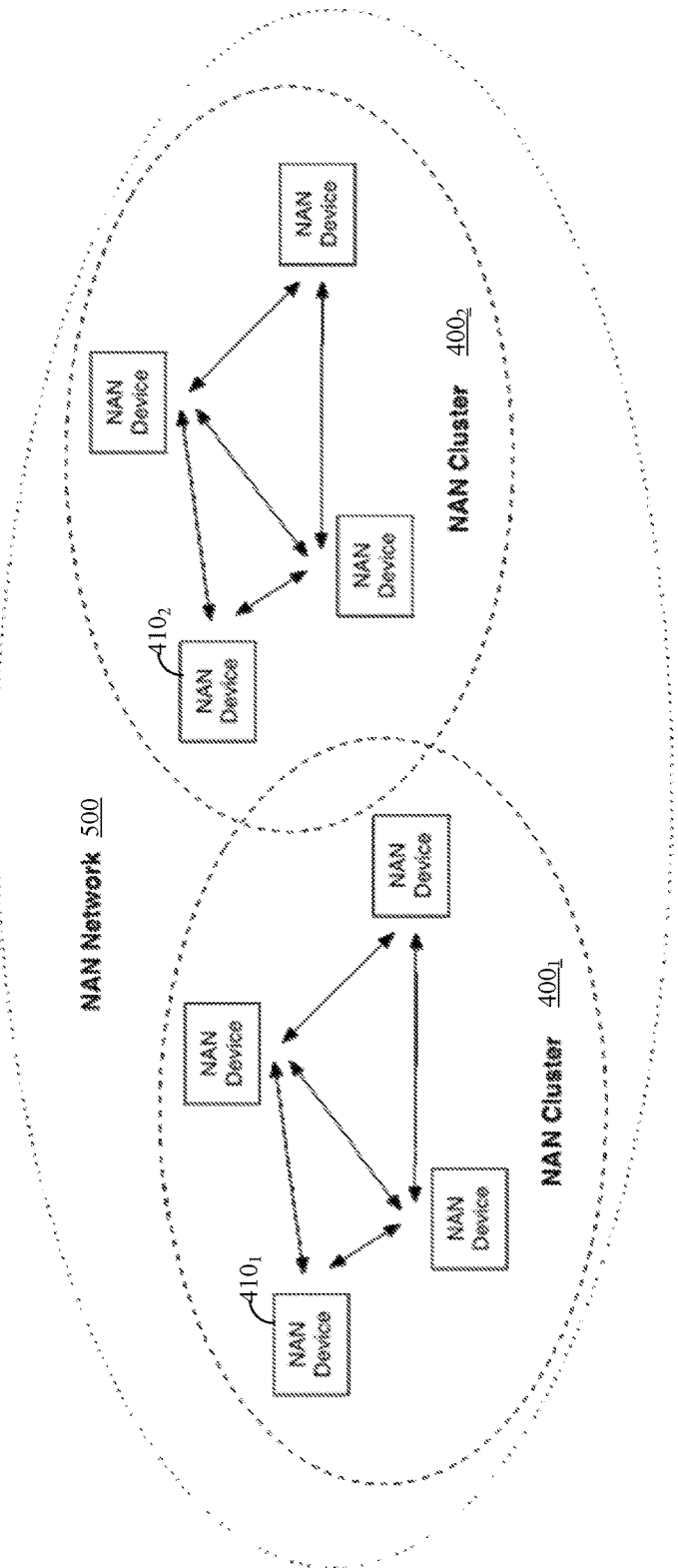
FIG. 5 illustrates an example NAN network with overlapping NAN clusters, in accordance with certain aspects of the present disclosure.

FIG. 5 illustrates an example NAN network 500 with overlapping NAN clusters $400_1$ (of NAN devices $410_1$) and $400_2$ (of NAN devices $410_2$), in accordance with certain aspects of the present disclosure. Although not shown in FIG. 5, a NAN device may participate in more than one overlapping cluster. Also not shown, a NAN device may operate concurrently in a NAN network with other types of WiFi networks (e.g., STAs in different homes or buildings as part of independent LANs with different external network connections) such as a wireless local area network (WLAN) or WiFi Direct.

NANs generally utilize a discovery window to advertise the existence of devices, services offered by the NAN, and synchronization information. During the discovery window, the NAN Devices are available (make themselves available) with high probability for mutual discovery. During interim periods the devices may be asleep or involved with other activities, for example, communicating on other networks, possibly on a different channel. A NAN device that creates the NAN cluster may define a series of discovery window start times (DWSTs).

NAN Devices participating in the same NAN Cluster are synchronized to a common clock. During a discovery window, one or more NAN Devices transmit NAN Synchronization Beacon frames to help all NAN Devices within the NAN Cluster synchronize their clocks. A timing synchronization function (TSF) keeps the timers of all NAN Devices in the same NAN Cluster synchronized. The TSF in a NAN Cluster may be implemented via a distributed algorithm and NAN Beacon frames can be transmitted according to the algorithm. A relative starting point or "time zero" may be defined as the first DWST. According to certain aspects, all devices in the NAN may wake up at the first discovery window (DW0), which may be defined, for example, as the discovery window in which the lower 23 bits of the TSF are zero. During subsequent discovery windows, certain NAN devices may choose to be awake (e.g., wake up if in a power save mode) or not be awake (e.g., enter or remain in a power save). Such synchronization may, thus, decrease the discovery latency, power consumption, and medium occupancy that would otherwise occur.

The NAN synchronization procedure is typically separate from the service discovery messaging. Although a NAN Device transmits not more than one Synchronization Beacon in a discovery window, multiple NAN Service Discovery frames may be transmitted by a NAN Device in a discover window. NAN Service Discovery frames enable NAN Devices to look for services from other NAN Devices and make services discoverable for other NAN Devices.

Conventionally, for the 2.4 GHz and 5 GHz bands, DWSTs have an interval of 512 time units (TUs), meaning the discovery windows are 512 TUs apart, and the length of the discovery period is 16 TUs. Also, for the 2.4 GHz and 5 GHZ bands, NAN synchronization and discovery beacon frames are based on a Beacon management frame format and NAN service discover frames are based on vendor specific public action frame formats.

Communication in the unlicensed sub-1 GHz (S1G) band provides extended range for WiFi networks, compared to conventional WiFi networks operating in the 2.4 GHz and 5 GHz bands, and may also have lower energy consumption. Medium access control (MAC) layer and physical (PHY) layer protocols for wireless local area networks (WLANs) in S1G have been defined (e.g., in the 802.11ah standard). NAN protocol for discovery in the S1G band can yield extended range of discovery, including large sensor deployments and outdoor extended ranges.

Accordingly, techniques and apparatus for numerology and frames for NANs in the S1G band are desirable.

Example Numerology and Frames for Neighbor Aware Networks (NAN) in the Sub-1 GHz (S1G) Band Aspects of the present disclosure provide, for neighbor aware networks (NAN) operation in the sub-1 GHz band (e.g., 900 GHz), at least two different types of discovery windows of different durations and occurring at different intervals. A NAN device (e.g., AP or non-AP station in the NAN) may wake up during one or both types of discovery windows to transmit or monitor for time synchronization information and/or service discovery information. The time synchronization information may be used to update an internal clock of the receiving device and the service information may be used to determine what services are available within the NAN.

According to certain aspects, for communications in the S1G band, NAN numerology (generally referring to the duration of discovery windows and intervals at which they occur) may be scaled by a factor of times 10 (relative to other bands). For example, as mentioned above, typical NAN numerology for the 2.4 GHz and 5 GHz bands, uses a discovery window with a duration of 16 TUs that occurs every 512 TUs. Thus, in order to scale the numerology by a factor of 10, S1G NANs may use discovery windows with a duration (width) of 160 TUs (i.e., 16 TUs×10=160 TUs) that occurs every 5120 TUs (i.e., 512 TUs×10=5120 TUs). However, this approach may have a latency for discovery.

According to certain aspects presented herein, tiered discovery windows may be used. Using this tiered approach, different discovery windows occurring at different intervals may allow for synchronization (and/or service) information to be obtained with less latency.

Figure 6:
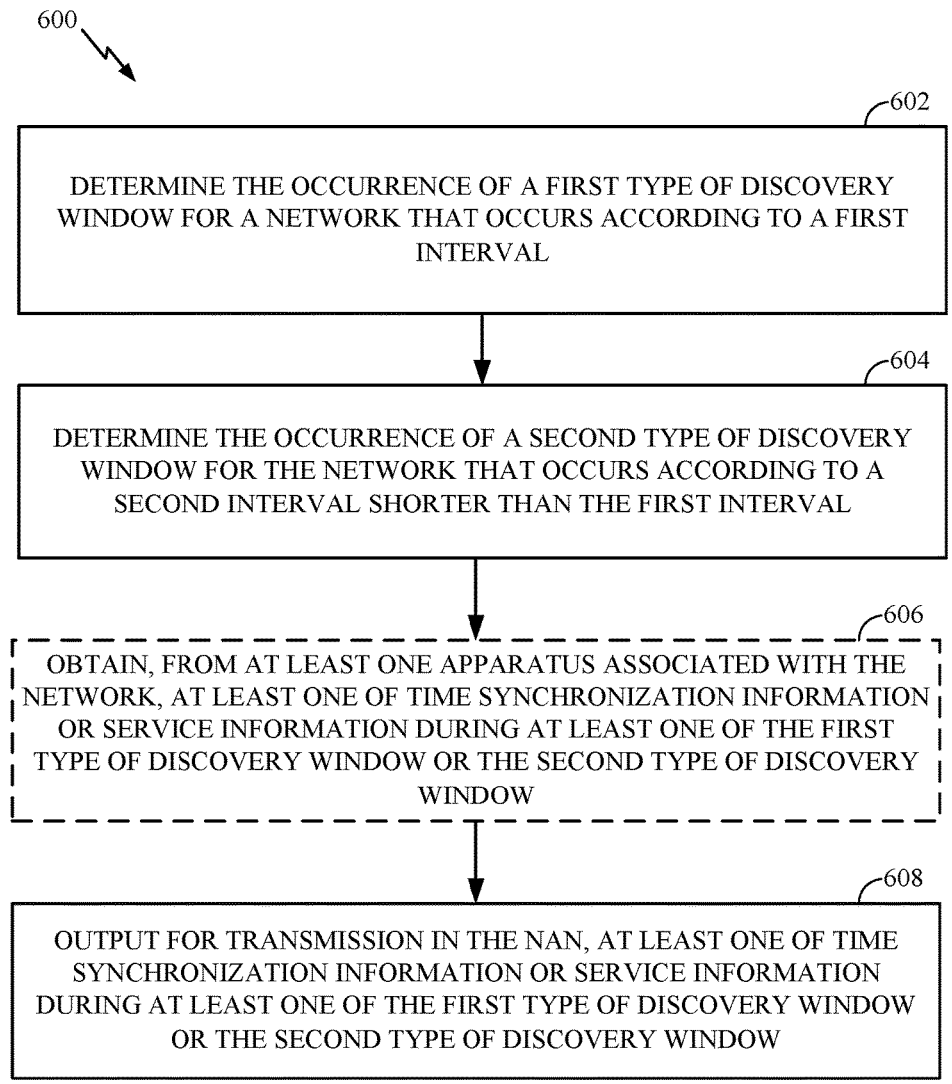
FIG. 6 illustrates a block diagram of example operations for wireless communications by an apparatus, in accordance with certain aspects of the present disclosure.
Figure 6A:
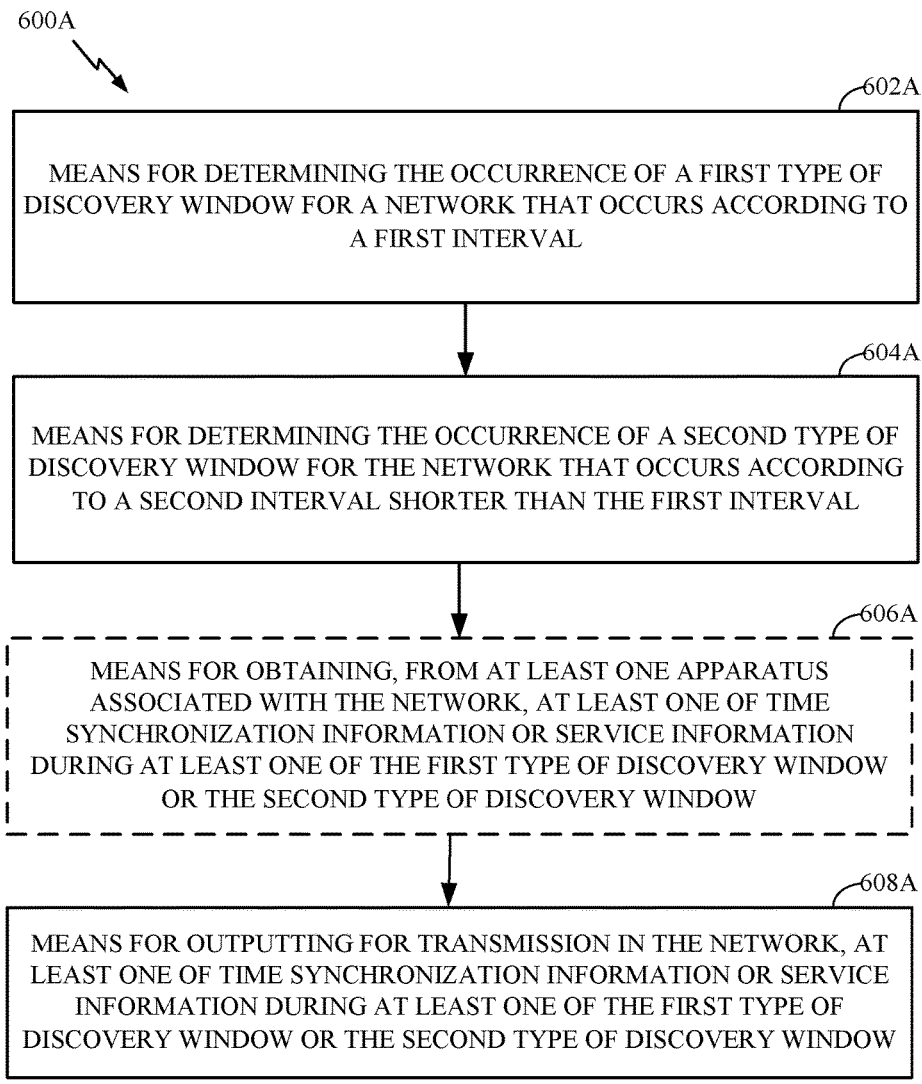
FIG. 6A illustrates example means capable of performing the operations shown in FIG. 6.

FIG. 6 illustrates example operations 600, in accordance with certain aspects of the present disclosure. The operations 600 may be performed by an apparatus, for example a NAN device (e.g., such AP 110 or user terminal 120).

The operations 600 begin, at 602, by determining the occurrence of a first type of discovery window for a network (e.g., a NAN) that occurs according to a first interval (e.g., 8192 TUs), based on the first interval and a time synchronization function (TSF) used by devices in the network. The first type of discovery window may also have a first duration (e.g., 60 TUs).

At 604, the NAN device may determine the occurrence of a second type of discovery window for the network that occurs according to a second interval (e.g., 512 TUs) shorter than the first interval, based on the second interval and the TSF. The second type of discovery window may also have a second duration (e.g., 16 TUs) which may be shorter than the first duration.

Optionally (as indicated by the dashed lines), at 606, the NAN device may obtain, from at least one other apparatus associated with the network, at least one of time synchronization information or service information during at least one of the first type of discovery window or the second type of discovery window. According to certain aspects, the time synchronization information may be used by the NAN device to update an internal clock.

At 608, the NAN device may output, for transmission in the network, at least one of time synchronization information or service information during at least one of the first type of discovery window or the second type of discovery window. For example, the first type of discovery window may be used for transmitting/receiving time synchronization information (e.g., which may be sent by a Master NAN device or a Synch NAN device).

In some cases, a NAN device may output time synchronization and/or service information during one or both discovery windows without obtaining such information from another apparatus. For example, an initiating NAN device (e.g., a first member of a cluster), may output such information without discovering it from another apparatus.

According to certain aspects, a frame with time synchronization information may be transmitted in each of the first type of discovery window. According to certain aspects, the second type of discovery window may be used for transmitting service information (e.g., by any of the devices in the NAN).

In one example, a NAN device may be in a low power state. The NAN device may determine to exit the low power state to transmit the frame during at least one of the first type of discovery window or the second type of discovery window. According to certain aspects, the NAN device may exit the low power state to transmit a frame with service information during only a subset of the second type of discovery window. According to certain aspects, the NAN device may exit the low power state to obtain a frame during the first type and/or the second type of discovery window. For example, the NAN device may obtain a frame including service information and determine services available in the NAN based on the service information. In one example, the NAN device may exit the low power state in a subset of the second type of discovery windows to obtain frames with service information. Transmitting on only a subset of discovery windows may allow for greater power savings and, in some cases, may allow for different devices to be assigned different discovery windows to avoid possible collisions.

Figure 7:
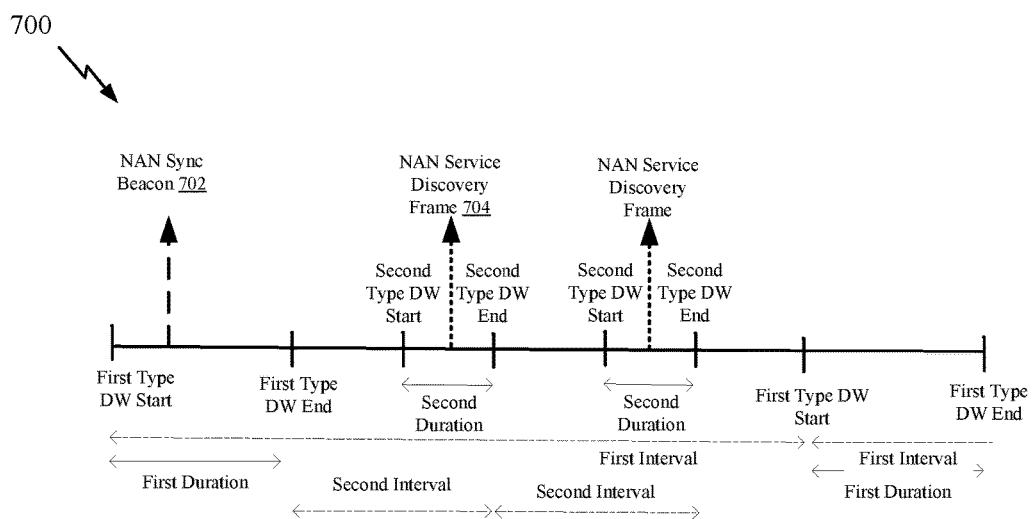
FIG. 7 is an example time sequence diagram illustrating an example discovery window period, in accordance with certain aspects of the present disclosure.

FIG. 7 is an example time sequence diagram 700 illustrating an example discovery window period, in accordance with certain aspects of the present disclosure. As shown in FIG. 7, according to one example implementation, a NAN sync beacon 702 may be sent in a first type of discovery window having a first duration and occurring according to a first interval, and NAN service discovery frames 704 may be sent in a second type of discovery window having a second short duration and occurring according to a second shorter interval.

Different types of frame formats may be used for NAN sync beacons 702 and NAN service discovery frames 704. According to certain aspects, NAN devices may use a Short Probe response frame format as the NAN beacon for time synchronization.

Figure 8:
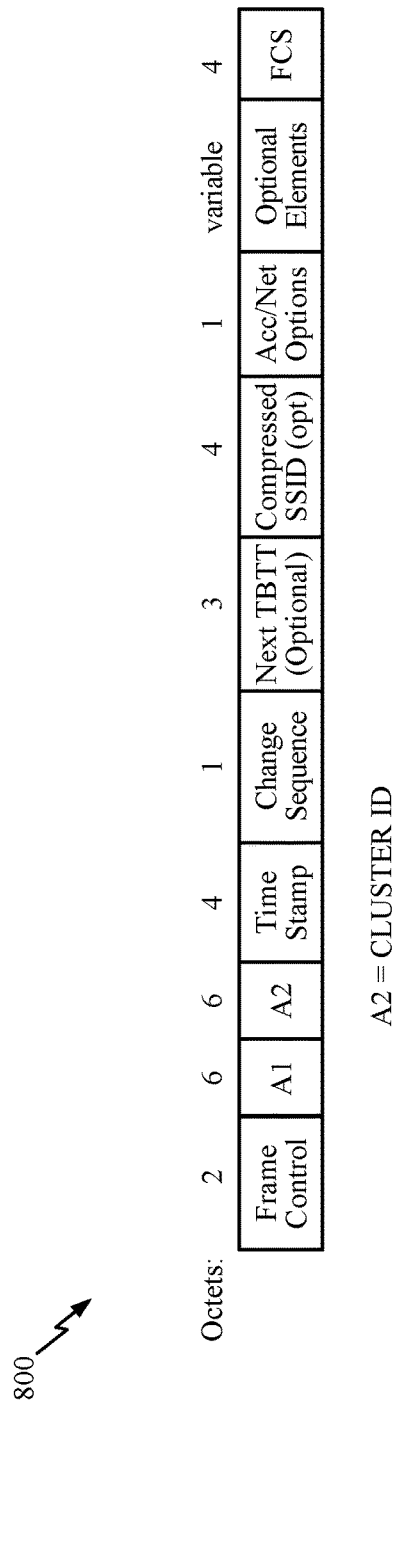
FIG. 8 illustrates an example Short Probe Response frame format, in accordance with certain aspects of the present disclosure.

FIG. 8 illustrates an example Short Probe Response frame format 800 which may be used a NAN synchronization or discovery beacon, in accordance with certain aspects of the present disclosure. For example, the A1 field may include the source address (e.g., the address of the NAN device sending the beacon).

As illustrated in FIG. 8, the A2 field may include the NAN Cluster ID. In some cases, the group bit in the address field may be set to 1 to indicate that the frame is addressed to a group. The NAN beacon may, in some cases, be 46 octets. Alternatively, with different length fields, the NAN beacon may be 40 octets and have a transmission time of 880 μs.

Figure 9:
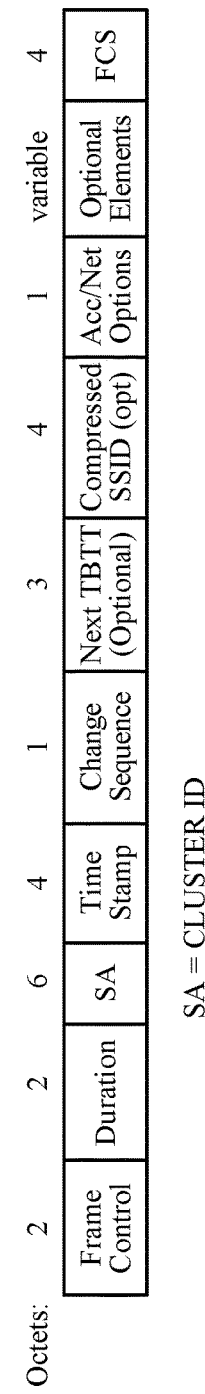
FIG. 9 illustrates an example Short Beacon frame format, in accordance with certain aspects of the present disclosure.

Alternatively, a Short Beacon format may be used. FIG. 9 illustrates an example Short Beacon frame format 900 which may be used a NAN synchronization or discovery beacon, in accordance with certain aspects of the present disclosure. As illustrated, according to certain aspects, the SA field may be set to the NAN Cluster ID, while the source address may be carried in the attributes. In some cases, the length of this NAN beacon may be 40 bytes and have a transmission time of 800 μs.

Figure 10:
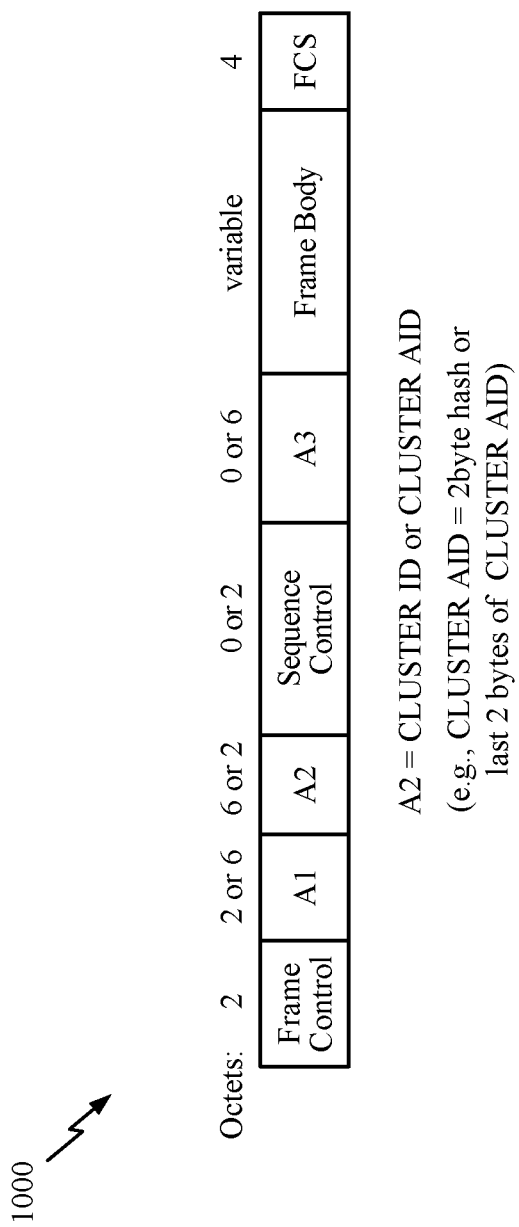
FIG. 10 illustrates an example Short Management frame format, in accordance with certain aspects of the present disclosure.

According to certain aspects, NAN devices may use a short management frame format for service discovery frames in a S1G NAN. FIG. 10 is an example Short Management Frame format 1000, in accordance with certain aspects of the present disclosure.

According to certain aspects, the A2 field may be set to the Cluster ID or to a shorter identification of the Cluster ID (e.g., a Cluster Association ID or AID). By using a shorter Cluster AID, this approach may save 12 bytes (which may save 160 μs at 600 Mbps). The Cluster AID may be defined, for example, as a 2 byte Hash of the Cluster ID. Alternatively, the short identification of the Cluster ID may be the last 2 bytes of the Cluster ID. In some cases, this may result in a frame with a length of 50 bytes with a transmission time of 1 ms.

According to certain aspects, using the numerology and frames described herein for NANs operating in the S1G band may balance rapid discovery with low power utilization and may enable large sensor deployments and outdoor extended ranges. The DW0 may permit around 40-60 discovery frames to get through within the window and other discovery windows may permit 10-12 frames to get through within the window. In some cases, to further reduce discovery time, devices may be configured to search only certain channels within a given operating band. For example, devices operating in a certain country or region may search a corresponding channel or subset of channels within an operating band.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 600 illustrated in FIG. 6 correspond to means 600A illustrated in FIG. 6A.

For example, means for receiving and means for obtaining may be a receiver (e.g., the receiver unit of transceiver 254) and/or an antenna(s) 252 of the user terminal 120 illustrated in FIG. 2 or the receiver (e.g., the receiver unit of transceiver 222) and/or antenna(s) 224 of access point 110 illustrated in FIG. 2. Means for transmitting and means for outputting may be a transmitter (e.g., the transmitter unit of transceiver 254) and/or an antenna(s) 252 of the user terminal 120 illustrated in FIG. 2 or the transmitter (e.g., the transmitter unit of transceiver 222) and/or antenna(s) 224 of access point 110 illustrated in FIG. 2.

Means for placing, means for generating, means for including, means for determining, means for exiting, and means for updating may comprise a processing system, which may include one or more processors, such as the RX data processor 270, the TX data processor 288, and/or the controller 280 of the user terminal 120 illustrated in FIG. 2 or the TX data processor 210, RX data processor 242, and/or the controller 230 of the access point 110 illustrated in FIG. 2.

According to certain aspects, such means may be implemented by processing systems configured to perform the corresponding functions by implementing various algorithms (e.g., in hardware or by executing software instructions) described above. For example, an algorithm determining occurrence of a first type of discovery window for a network that occurs according to a first interval, an algorithm for determining occurrence of a second type of discovery window for the that occurs according to a second interval shorter than the first interval, an algorithm for obtaining, from at least one other apparatus associated with the network, at least one of time synchronization information or service information during at least one of the first type of discovery window or the second type of discovery window, and an algorithm for outputting, for transmission in the network, at least one of the time synchronization information or the service information during at least one of the first type of discovery window or the second type of discovery window.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining occurrence of a first type of discovery window for a network that occurs according to a first interval, instructions for determining occurrence of a second type of discovery window for the that occurs according to a second interval shorter than the first interval, instructions for obtaining, from at least one other apparatus associated with the network, at least one of time synchronization information or service information during at least one of the first type of discovery window or the second type of discovery window, and instructions for outputting, for transmission in the network, at least one of the time synchronization information or the service information during at least one of the first type of discovery window or the second type of discovery window.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a processing system configured to:
    determine occurrence of a first type of discovery window for a network that occurs according to a first interval, and
    determine occurrence of a second type of discovery window for the network that occurs according to a second interval shorter than the first interval; and
a first interface configured to output, for transmission in the network, at least one of time synchronization information or service information during at least one of the first type of discovery window or the second type of discovery window.

2. The apparatus of claim 1, further comprising:
a second interface configured to obtain, from at least one other apparatus associated with the network, at least one of the time synchronization information or the service information during at least one of the discovery window of the first type or the discovery window of the second type.

3. The apparatus of claim 1, wherein the processing system is further configured to determine, based on at least one of a location or a region associated with the apparatus, a subset of one or more channels within an operating band to use for obtaining the time synchronization information or the service information.

4. The apparatus of claim 1, wherein the processing system is configured to:
determine occurrence of the discovery window of the first type based on the first interval and a time synchronization function (TSF) used by devices in the network, and
determine occurrence of the discovery window of the second type based on the second interval and the TSF.

5. The apparatus of claim 1, wherein the network comprises a neighbor aware network (NAN).

6. The apparatus of claim 1, wherein:
the discovery window of the first type is for communicating at least the time synchronization information, and
the discovery window of the second type is for communicating at least the service information, and wherein the service information is for advertising what services are available within the network.

7. The apparatus of claim 1, wherein:
the discovery window of the first type has a first duration, and
the discovery window of the second type has a second duration that is shorter than the first duration.

8. The apparatus of claim 1, wherein the time synchronization information and the service information are communicated via a sub-1 GHz (S1G) band.

9. The apparatus of claim 1, wherein:
the processing system is configured to generate a frame including the time synchronization information or the service information, and
the first interface is configured to output the frame for transmission during at least one of the discovery window of the first type or the discovery window of the second type.

10. The apparatus of claim 1, wherein the processing system is configured to generate a frame including the time synchronization information to be output for transmission in each occurrence of the discovery window of the first type.

11. The apparatus of claim 10, wherein the processing system is configured to:
place the apparatus in a first power state, and
exit the first power state to transmit the frame during at least one of the discovery window of the first type or the discovery window of the second type.

12. The apparatus of claim 1, wherein the processing system is configured to:
generate a frame including the service information,
place the apparatus in a first power state, and
exit the first power state to transmit the frame during only a subset of occurrences of the discovery window of the second type.

13. The apparatus of claim 12, wherein the processing system is configured to generate the frame based on a short probe response frame format, a short beacon frame format, or a short management frame format.

14. The apparatus of claim 12, wherein an identification of a group of apparatuses in the network is included in an address field of the frame.

15. The apparatus of claim 12, wherein a source address of the apparatus is included in an optional elements field of the frame.

16. The apparatus of claim 12, wherein a short identification of a group of apparatuses in the network, generated based on a longer identification of the group of apparatuses, is included in an address field of the frame.

17. The apparatus of claim 16, wherein the short identification comprises a hash of the longer identification or one or more least significant bytes of the longer identification.

18. The apparatus of claim 1, wherein:
the apparatus further comprises a second interface configured to obtain, during at least one of the discovery window of the first type or the discovery window of the second type, a frame including the time synchronization information; and
the processing system is configured to update an internal clock based on the time synchronization information.

19. The apparatus of claim 18, wherein the processing system is configured to:
place the apparatus in a first power state, and
exit the first power state to obtain the frame during at least one of the discovery window of the first type or the discovery window of the second type.

20. The apparatus of claim 1, wherein:
the apparatus further comprises a second interface configured to obtain, during at least one of the discovery window of the first type or the discovery window of the second type, a frame including the service information; and
the processing system is configured to determine services available in the network, based on the service information and decide whether to attempt to join the network based on the determined services.

21. The apparatus of claim 20, wherein the processing system is configured to:
place the apparatus in a first power state, and
exit the first power state to obtain the frame during at least one of the discovery window of the first type or the discovery window of the second type.

22. The apparatus of claim 21, wherein the processing system is configured to:
exit the first power state to obtain the frame during only a subset of occurrences of the discovery window of the second type.

23. A method for wireless communications by an apparatus, comprising:
determining occurrence of a first type of discovery window for a network that occurs according to a first interval;
determining occurrence of a second type of discovery window for the network that occurs according to a second interval shorter than the first interval; and
outputting, for transmission in the network, at least one of time synchronization information or service information during at least one of the first type of discovery window or the second type of discovery window.

24. An apparatus for wireless communications, comprising:
means for determining occurrence of a first type of discovery window for a network that occurs according to a first interval;
means for determining occurrence of a second type of discovery window for the network that occurs according to a second interval shorter than the first interval; and
means for outputting, for transmission in the network, at least one of time synchronization information or service information during at least one of the first type of discovery window or the second type of discovery window.

25. A station, comprising:
a processing system configured to:
   determine occurrence of a first type of discovery window for a network that occurs according to a first interval, and
   determine occurrence of a second type of discovery window for the network that occurs according to a second interval shorter than the first interval; and
a transmitter configured to transmit at least one of time synchronization information or service information during at least one of the first type of discovery window or the second type of discovery window.

\* \* \* \* \*